UNITED STATES PATENT OFFICE.

CHRISTIAN RUDOLPH, OF HÖCHST-ON-THE-MAIN, GERMANY, ASSIGNOR TO FARBWERKE, VORMALS MEISTER, LUCIUS & BRÜNING, OF SAME PLACE.

PRODUCTION OF METHYLQUINOLINE.

SPECIFICATION forming part of Letters Patent No. 268,543, dated December 5, 1882.

Application filed August 9, 1882. (No specimens.)

*To all whom it may concern:*

Be it known that I, CHRISTIAN RUDOLPH, a citizen of the Empire of Germany, residing at Höchst-on-the-Main, Germany, have invented certain new and useful Improvements in the Production of Methylquinoline from Orthonitrobenzylidenacetone, of which the following is a specification.

My present invention relates to the production from orthonitrobenzylidenacetone of methylquinoline.

I obtain the orthonitrobenzylidenacetone by nitration of monobenzylidenacetone, as described by Schmidt Claisen, (Berichte der Deutsch Chem. Gesellschaft, 1881, pp. 24, 72.)

The nitration of monobenzylidenacetone can be done by various methods, and as an example I give the following: Take one part of monobenzylidenacetone and mix the same with a quintuple quantity of sulphuric acid. Into this mixture pour slowly at a temperature of 32° to 59° Fahrenheit (0 to 15° centigrade) the calculated quantity of nitric acid, of 1.46 specific gravity, dissolved in the double quantity of sulphuric acid. After this operation is complete the nitro compounds which remain in solution in the sulphuric acid are separated by pouring said solution into a quantity of water. They are afterward collected on a filter carefully washed in water, and dissolved in one and a half the quantity of alcohol. After standing several hours from this solution paranitrobenzylidenacetone will have been almost completely separated. The mother-lye will contain the orthonitrobenzylidenacetone, which may be obtained by distilling off the alcohol or by adding to the said mother-lye a triple or quadruple quantity of water. The orthonitrobenzylidenacetone thus obtained is treated with reducing agents, and by such treatment is transformed into methylquinoline, $C_6H_4NO_2 CH.CH.CO.CH_3 + 3H_2 = C_6H_4,C_3H_2(CH_3)N + 3H_2O$. This base can be used for the production of azo coloring-matters.

According to my experience tin chloride and muriatic acid are the agents best adapted for the reduction of the orthonitrobenzylidenacetone, and they may be employed as follows: For every twenty parts of orthonitrobenzylidenacetone I use seventy-five parts of tin chloride and seventy-five parts muriatic acid, of 1.2 specific gravity, diluted in its own quantity of water. The methylquinoline forms under a high temperature. To the mass resulting from the reaction I add an excess of hydrate of lime and separate the new base by distillation in a current of steam. The methylquinoline boils at a temperature of about 464° Fahrenheit, (240° centigrade,) and yields salts which crystallize beautifully.

Having thus described my invention, what I claim as new, and desire to secure by Letters Patent, is—

1. The process for producing methylquinoline from orthonitrobenzylidenacetone, which consists in treating the same with reducing agents and obtaining it in a pure state by distillation in a current of steam, substantially as herein described.

2. Methylquinoline produced from orthonitrobenzylidenacetone in a manner substantially as herein set forth.

In testimony whereof I affix my signature in presence of two witnesses.

CHRISTIAN RUDOLPH.

Witnesses:
JOSEPH E. REVERDY,
ALBERT FRÖSCHMAN.